United States Patent [19]

Klieman

[11] 4,255,859
[45] Mar. 17, 1981

[54] DROP-WEIGHT MATERIAL LEVEL INDICATOR

[75] Inventor: Kenneth J. Klieman, St. Clair, Mich.

[73] Assignee: Berwind Corporation, Philadelphia, Pa.

[21] Appl. No.: 36,824

[22] Filed: May 7, 1979

[51] Int. Cl.³ ............................................ G01F 23/04
[52] U.S. Cl. .................................... 33/126.6; 73/311; 73/321
[58] Field of Search ................ 73/321, 311; 33/126.6, 33/126.5, 126, 126.4 R, 126.4 A, 126.7 A

[56] References Cited

U.S. PATENT DOCUMENTS

| | | |
|---|---|---|
| 2,627,660 | 2/1953 | Smith . |
| 2,754,596 | 7/1956 | O'Brien, Jr. |
| 3,034,217 | 5/1962 | Mayes et al. |
| 3,128,557 | 4/1964 | Childs .................. 33/126.6 |
| 3,140,609 | 7/1964 | Mayes .................. 33/126.6 X |
| 3,629,946 | 12/1971 | Parsons .................. 33/126.5 |
| 3,701,139 | 10/1972 | Creuz . |
| 3,735,260 | 5/1973 | Hartline et al. |
| 3,742,307 | 6/1973 | Patsch et al. |
| 3,838,518 | 10/1974 | Hendrickson ............ 33/126.6 |
| 3,895,277 | 7/1975 | Klumpp . |

FOREIGN PATENT DOCUMENTS

| | | |
|---|---|---|
| 250044 | 10/1966 | Austria ........................ 73/321 |
| 1289091 | 2/1962 | France ...................... 33/126.6 |

OTHER PUBLICATIONS

Electromechanical Level Control, published by Bindicator Company.
Monitor Automatic Level Indicators, published by Monitor Manufacturing Company, 1976.
Bindicator "Yo-Yo" published by Bindicator.

Primary Examiner—William D. Martin, Jr.
Attorney, Agent, or Firm—Barnes, Kisselle, Raisch & Choate

[57] ABSTRACT

A drop-weight type material level indicator apparatus, method and system wherein an optical disc rotationally coupled to an idler pulley in a modular sensor unit mounted at the top of a material storage bin generates counting pulses as a cable trained over the idler pulley lowers a drop weight. The counting pulses are fed in a remote readout unit to an up/down counter selectively for indicating in an up-counting mode of operation the ullage or head space between the sensor and material level, and in a down-counting mode of operation the level of material in the storage bin. Switches are provided for presetting the counter in the down-counting mode of operation to a value corresponding to bin height. Each modular sensor unit is individually connected to the remote readout unit and is capable of rewinding its associated drop weight cable independently of the readout unit so that a subsequent sensor unit may be selected and a material level indication obtained while the previously-selected sensor returns to the rest condition.

15 Claims, 7 Drawing Figures

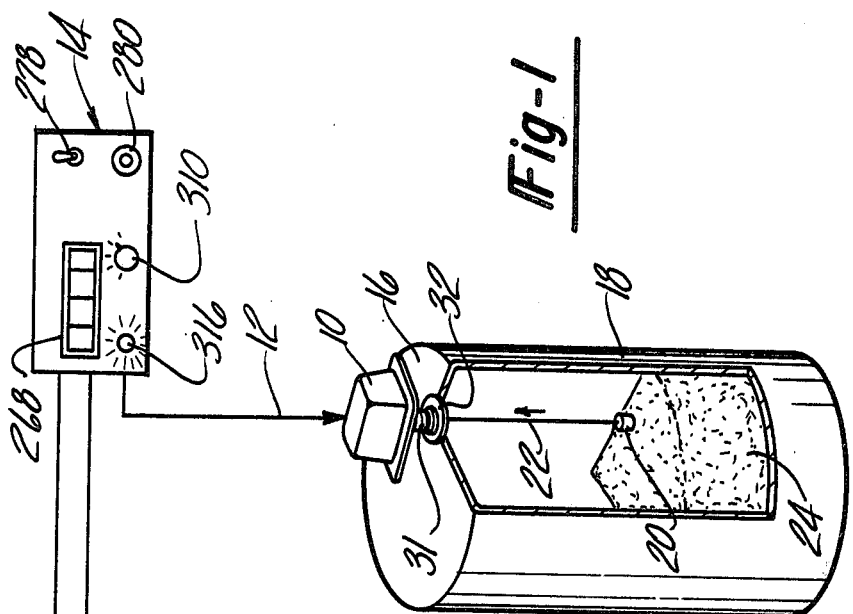
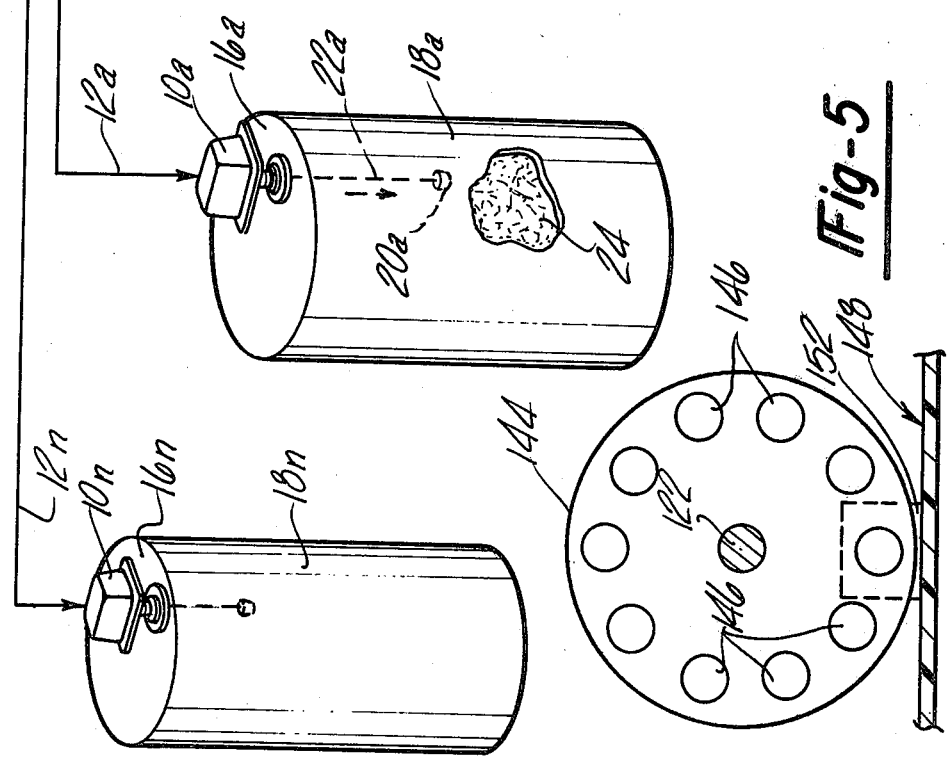

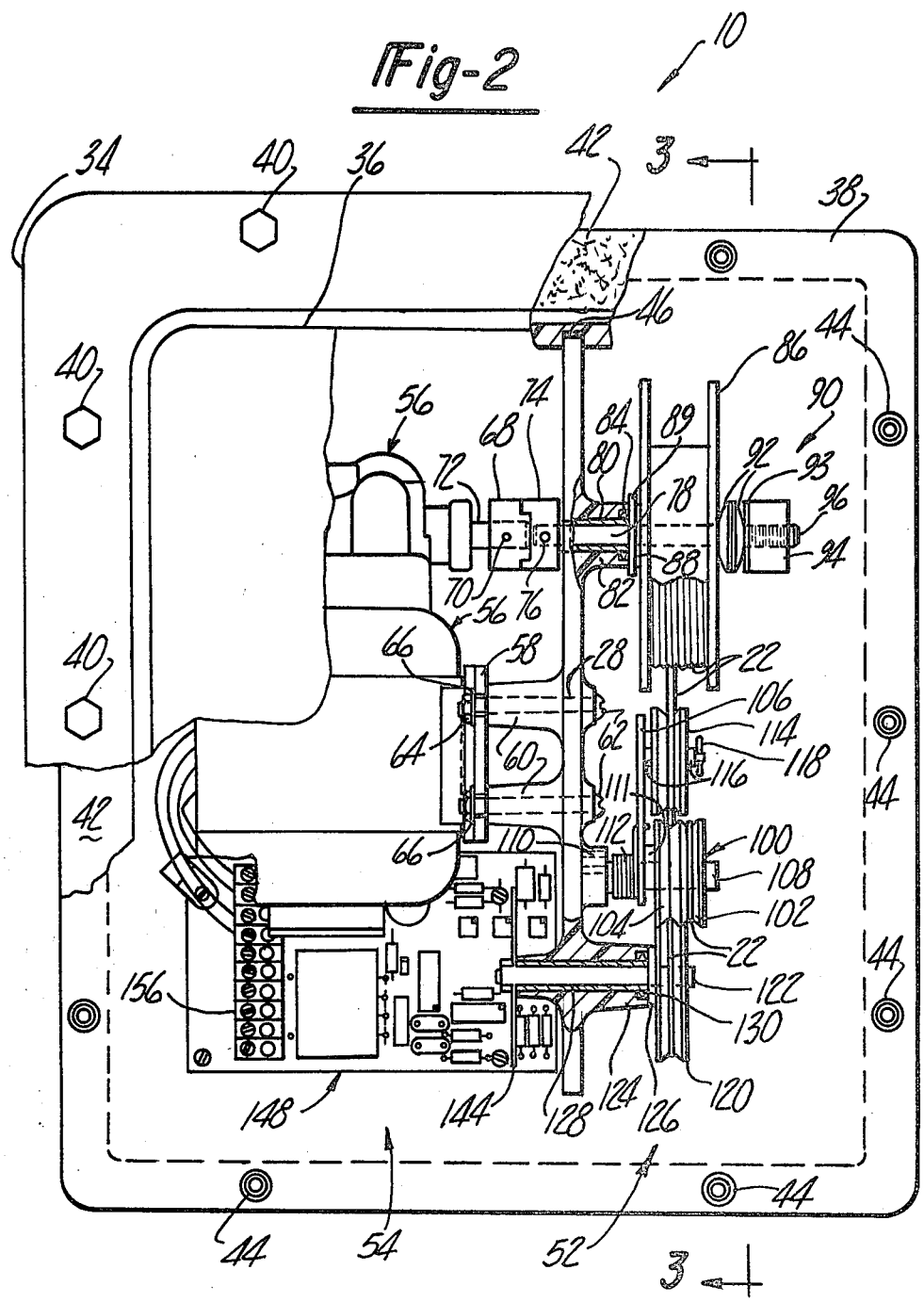

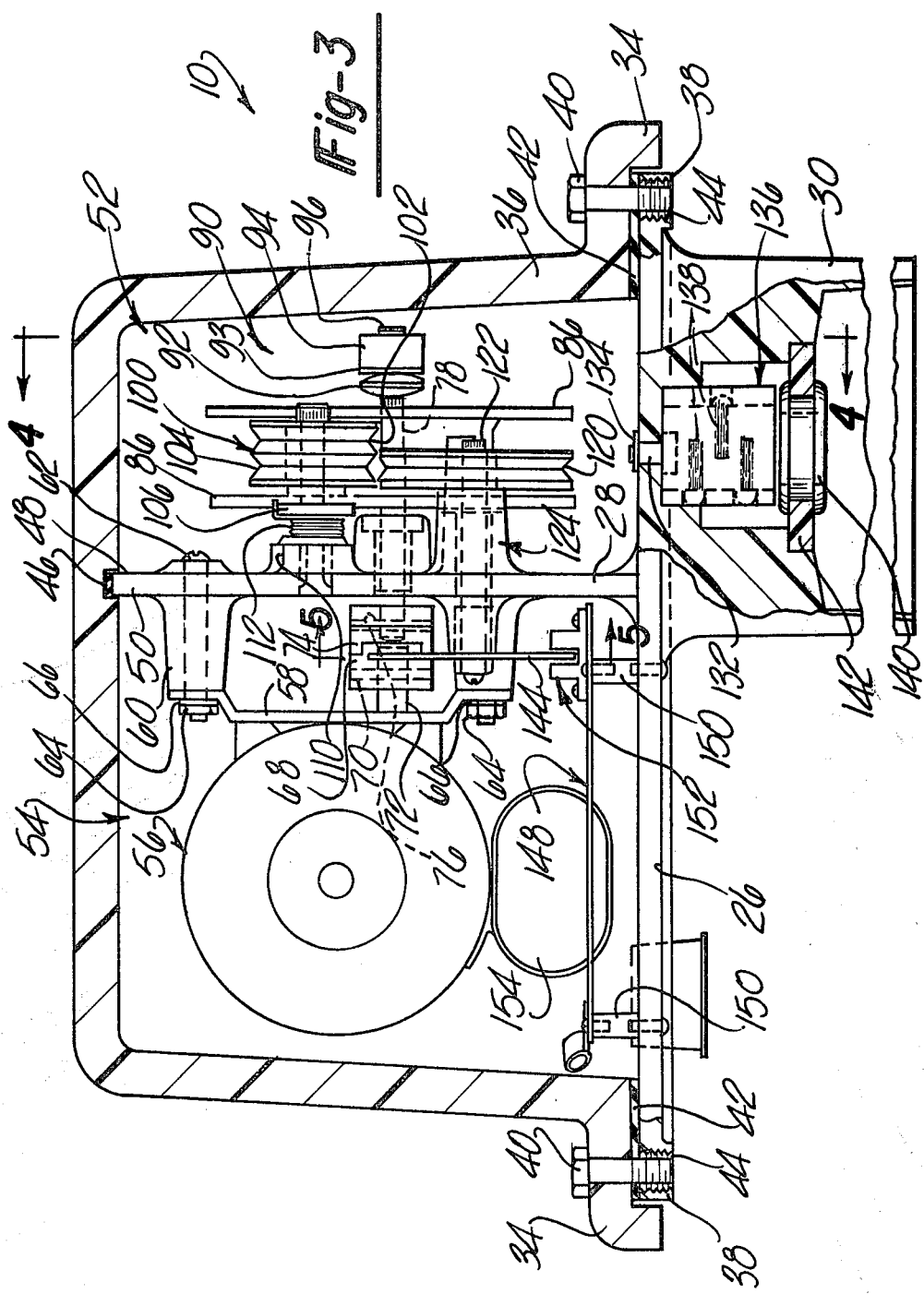

DROP-WEIGHT MATERIAL LEVEL INDICATOR

The present invention pertains to drop-weight or sounding-type apparatus for indicating the level of material in a storage tank or bin, and to material level indicating systems and methods comprising a plurality of drop-weight indicators for indicating material levels in a series of storage bins.

An object of the present invention is to provide a drop-weight material level indicator of light weight and economical construction which embodies state-of-the-art electronic technology for enhanced economy and reliability.

A further object of the invention is to provide an improved material level indicating system and method which contemplate a plurality of drop-weight sensor units mounted on associated storage bins and a separate modular readout unit individually and remotely connected to the plurality of sensor units.

A further object of the invention is to provide an indicator of the described type which includes facility for alternative selection of material level readings in terms of bin head space or ullage in one mode of operation and material height in another mode of operation.

The invention, together with additional objects, features and advantages thereof, will be best understood from the following description, the appended claims and the accompanying drawings in which:

FIG. 1 is a schematic illustration not to scale showing a material level system in accordance with the invention comprising separate modular sensor units individually connected to a remote readout unit;

FIGS. 2–4 are sectional views in plan, front elevation and side elevation respectively of a drop-weight sensor unit in accordance with the invention, FIGS. 3 and 4 being taken generally along the lines 3—3 and 4—4 in FIGS. 2 and 3 respectively;

FIG. 5 is an elevational view of the optical disc or counting wheel in the sensor unit of FIGS. 2–4 and is taken generally along the line 5—5 in FIG. 3;

Figure 4:
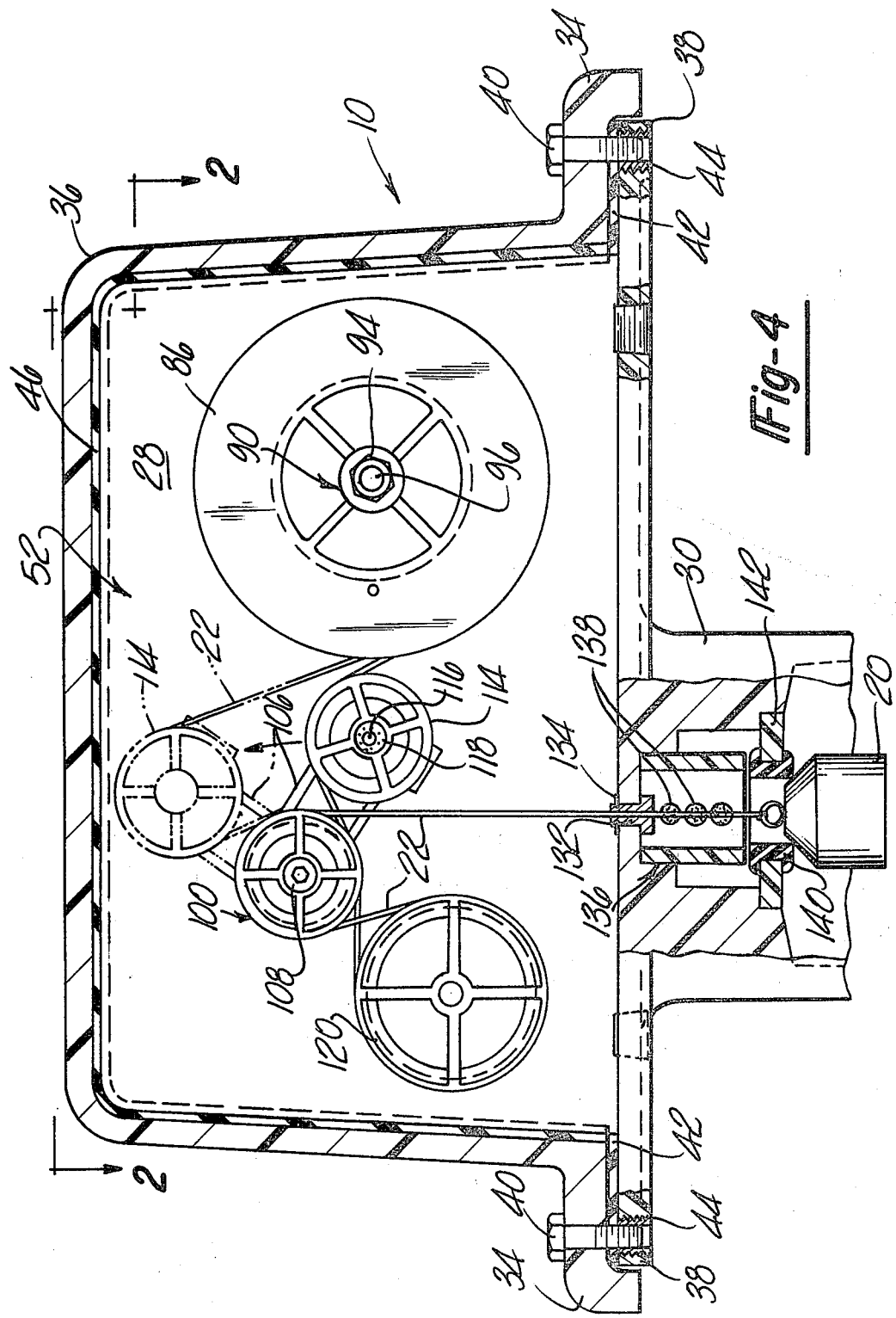

FIG. 1 illustrates a material level indicating system in accordance with the invention as comprising a plurality of sensor units 10,10a, . . . 10n individually connected by corresponding cables 12–12n to a remote modular readout unit 14. Each sensor unit 10–10n is mounted to the top 16–16n of an associated material storage tank or bin 18–18n and is controlled by readout unit 14 for indicating the level of material 24 in the associated bin. With the exception of being individually connected to readout unit 14, the sensor units 10–10n are identical to each other. Mechanical details of sensor unit 10 will be described in detail in connection with FIGS. 2–5 and the electrical features of sensor unit 10 will be described in connection with FIG. 6. Readout unit 14 will be described in detail in connection with FIG. 7.

Referring to FIGS. 1–5, sensor unit 10 comprises a flat rectangular base 26 having an integral wall 28 vertically upstanding therefrom and a hollow depending collar 30. A nipple 31 is threaded at its upper end into collar 30 and at its lower end into a pipe flange 32 for externally mounting sensor unit 10 to the top 16 of storage bin 18 (FIG. 1). A generally cup-shaped rectangular cover 36 has an outwardly and downwardly flared lip 34 extending around its open end and fitted over the perimeter 38 of base 26. Cover 36 is secured to base 26 by the bolts 40 extending downwardly through lip 34 and threadably received into the nuts 44 embedded in base 26. An annular gasket 42 apertured to receive bolts 40 is compressed between cover lip 34 and the opposing surface of base 26 to seal the internal volume of sensor unit 10 from the external atmosphere. A sealing strip 46 is disposed in an internal channel 48 extending around cover 36 in registry with the outside edge 50 of upstanding wall 28 for separating the enclosed volume of sensor unit 10 generally into two compartments 52,54 sealed from each other. Preferably, cover 36 and base 26 are molded of suitable plastic material such as closed cell polyurethane. Nuts 44 preferably are molded into base 26 as described, although other means for post-fabrication permanent embedment are contemplated. Alternatively, cover 36 and base 26 may be of cast aluminum or steel construction as is conventional.

A gear reduction motor 56 (FIGS. 2 and 3) in chamber 54 has a mounting bracket 58 rigidly fastened to the bosses 60 projecting from wall 28 by the screws 62, nuts 64 and lock washers 66. A coupling member 68 is mounted by a pin 70 to the stub drive shaft 72 projecting from motor 56. A second member 74 rotationally coupled to member 68 is mounted by a pin 76 to a shaft 78 which extends through a boss 82 in wall 28 into chamber 52. A sleeve bearing 80 and a lip seal 84 are press fitted into boss 82 and surround shaft 78. A cable spool 86 is loosely received on shaft 78 and is captured between a freely rotatable washer 88 and a friction slip clutch generally indicated at 90. A roll pin 89 extends through shaft 78 between washer 88 and boss 82. Clutch 90 comprises an opposing pair of belville springs 92 compressed by a washer 93, a collar 94 threaded over the free end of shaft 78 and biasing spool 86 into frictional abutment against roll pin 89 through washer 88. A set screw 96 is threaded axially into collar 94 into opposed abutment with shaft 78 for holding the collar in a desired adjusted position on the shaft. A drop line 22 (FIGS. 1, 2 and 4) is fastened at one end (not shown) to and wound around spool 86. Thus, springs 92 hold spool 86 against roll pin 89 and thereby normally frictionally couple the spool to motor 56 through drive shafts 72,78. However, in the cable rewind mode of operation to be described in greater detail hereinafter, an excess pulling force on cable 22 will operate to overcome the spring-biased frictional engagement between spool 86 and roll pin 89 effectively to disengage the spool from motor 56. Collar 94 may be factory adjusted to yield a friction release torque of spool 86 which is effective to protect motor 56 from damage and drop line 22 from fracture. Preferably, such torque is in the range of six to eight inch-pounds.

A first idler pulley 100 (FIGS. 2–4) having a pair of laterally spaced pulley grooves or channels 102,104 and a lever arm 106 are both rotatably mounted on the shank of a cap head screw 108 in chamber 52, screw 108 extending in turn through pulley 100 and lever arm 106 to be threadably received in a boss 110 on wall 28. A thrust washer bearing 111 separates pulley 100 from lever 106. A spring 112 (FIGS. 2 and 3) is coiled around screw 108 between lever arm 106 and boss 110, and has a pair of axially extending end tines (not shown) engaging lever arm 106 and boss 110 for biasing the lever arm counterclockwise upwardly and away from spool 86 (FIG. 4). A shaft 116 is fixedly attached to an upper end of lever arm 106 and projects laterally therefrom on an axis parallel with the axes of rotation of spool 86 and pulley 100. A second idler pulley 114 is carried for free rotation on shaft 116 and, as best seen in FIGS. 2 and 3, is axially free to slide on shaft 116 through a lateral displacement range which sweeps the width of spool 86. A grip ring 118 is received over the free end of shaft 116 and retains pulley 114 on the shaft.

A third idler pulley 120, having a groove 122 of preselected and closely controlled circumferential dimension, is press fitted over the knurled end of a shaft 122 extending through the boss 124 on support wall 28. Pulley 120 is positioned laterally beneath the inner channel 104 of double groove pulley 100 and is separated from boss 124 by the thrust washer bearing 126. A sleeve bearing 128 is press fitted into boss 124 to surround shaft 122, and a lip seal 130 is disposed in boss 124 beneath washer 126. Thus, it will be appreciated that the components in sensor chamber 52 are coupled to those in chamber 54 by shafts 78,122 (FIG. 2) and are sealed therefrom by lip seals 84,130 surrounding the drive shafts in cooperation with sealing strip 46 (FIGS. 2–4) surrounding wall 28. Pulleys 120, 100 and 114 and spool 86 are all preferably of molded plastic construction. Lever 106 and shaft 116 are also preferably of integral molded plastic construction.

The drop line or cable 22, which is shown in the fully raised position in FIG. 4, is trained from beneath spool 86 upwardly over second idler pulley 114. Thus, the portion of cable 22 extending between spool 86 and pulley 114 is held in tension by the upward bias on lever 106 from spring 112 (FIGS. 2 and 3). Cable 22 is then trained from pulley 114 under pulley 100 in the axially inner channel 104 thereof, and then around pulley 120. Pulley 114 will seek a lateral position on shaft 116 which aligns the inner channel 104 on groove 100 with the wrap or ply on spool 86 from which cable 22 extends. The cable is then trained from beneath pulley 120 over pulley 100 in outer channel 102, and then extends downwardly through collar 30. Drop weight 20 is suspended from the free end of cable 22. As will be best appreciated with reference to FIG. 4, double groove pulley 100 enhances the area or arc of contact between cable 22 and pulley 120, and thereby minimizes the liklihood of slippage due to loss of frictional engagement therebetween.

A cable guide 132 is mounted by the grip ring 134 in an aperture in base 26 beneath the outer groove 102 of pulley 100 and feeds cable 22 from sensor chamber 52 to the interior of mounting collar 30. A wiper assembly 136 comprising a plurality of cable brushes 138 is carried interiorly of collar 30 for wiping dust and debris from cable 22 as it is retracted into sensor unit 10. An annular rubber bumper 140 is mounted on a retaining ring 142 which, in turn, is glued or otherwise adhered internally to collar 30 for providing a resilient abutment for weight 20 in the fully retracted position and thereby helping to seal sensor unit 10 from the storage bin interior.

In sensor chamber 54, the shaft 122 coupled to idler pulley 120 is rotationally coupled to a counting disc 144 having a perimetric array of optically transparent apertures or windows 146. An electronic circuit board assembly 148 is mounted on standoffs 150 to base 26 in chamber 54. An optical coupler 152 comprising photoemissive and photosensitive elements (FIG. 6) is carried by circuit board 148 and has a central channel or air gap which receives the periphery of disc 144 such that the transparent windows 146 are passed successively between the photoemissive and sensitive elements of coupler 152 as the disc is rotated. The remaining electrical components (FIG. 2) carried by circuit board assembly 148 will be discussed in detail in connection with FIG. 6. A starting capacitor 154 (FIG. 3) is strapped to gear reduction motor 56.

Figure 6:
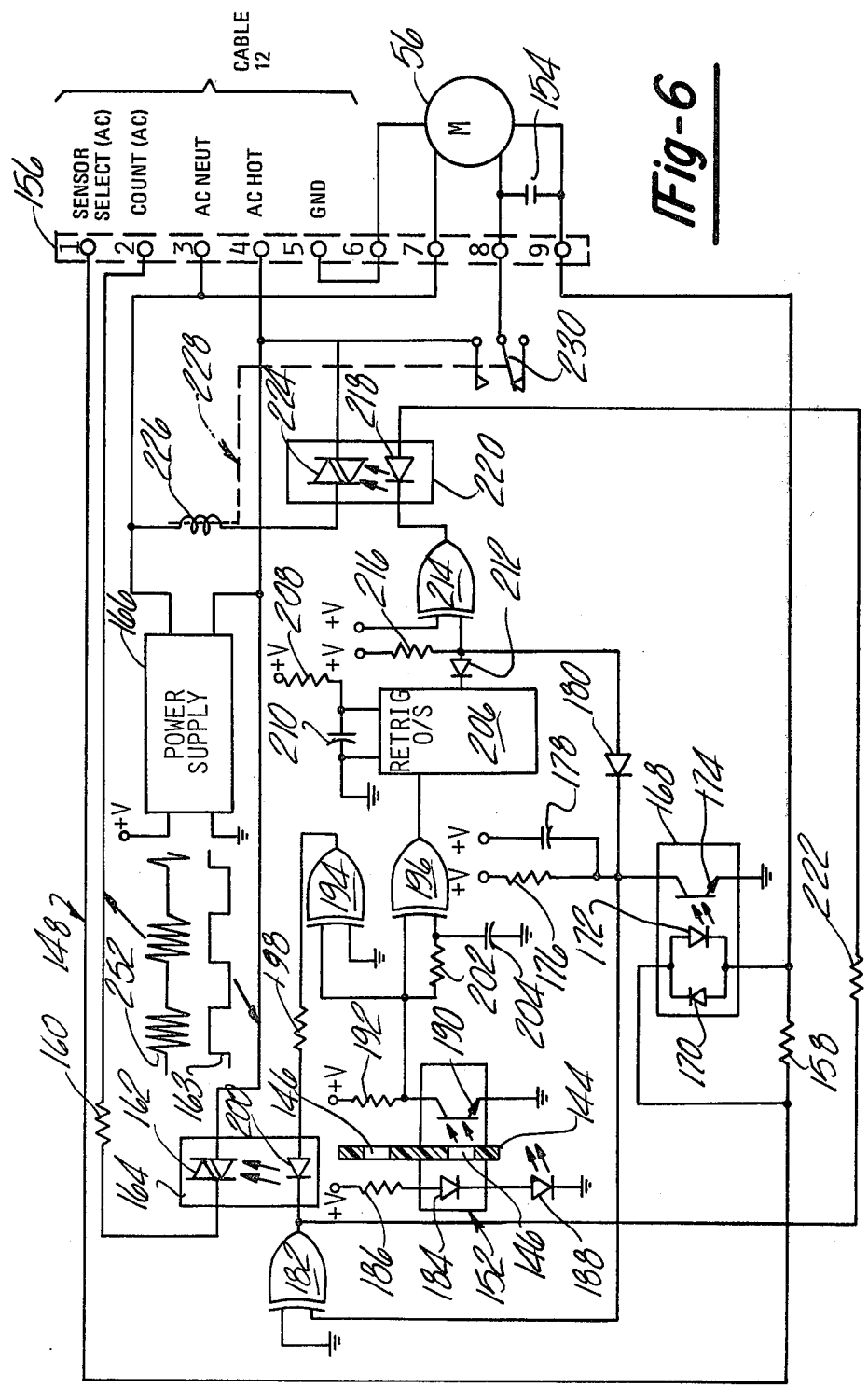
FIG. 6 is a partially schematic and partially functional block diagram of the electrical circuitry in the sensor unit of FIGS. 1–4.
Figure 7:
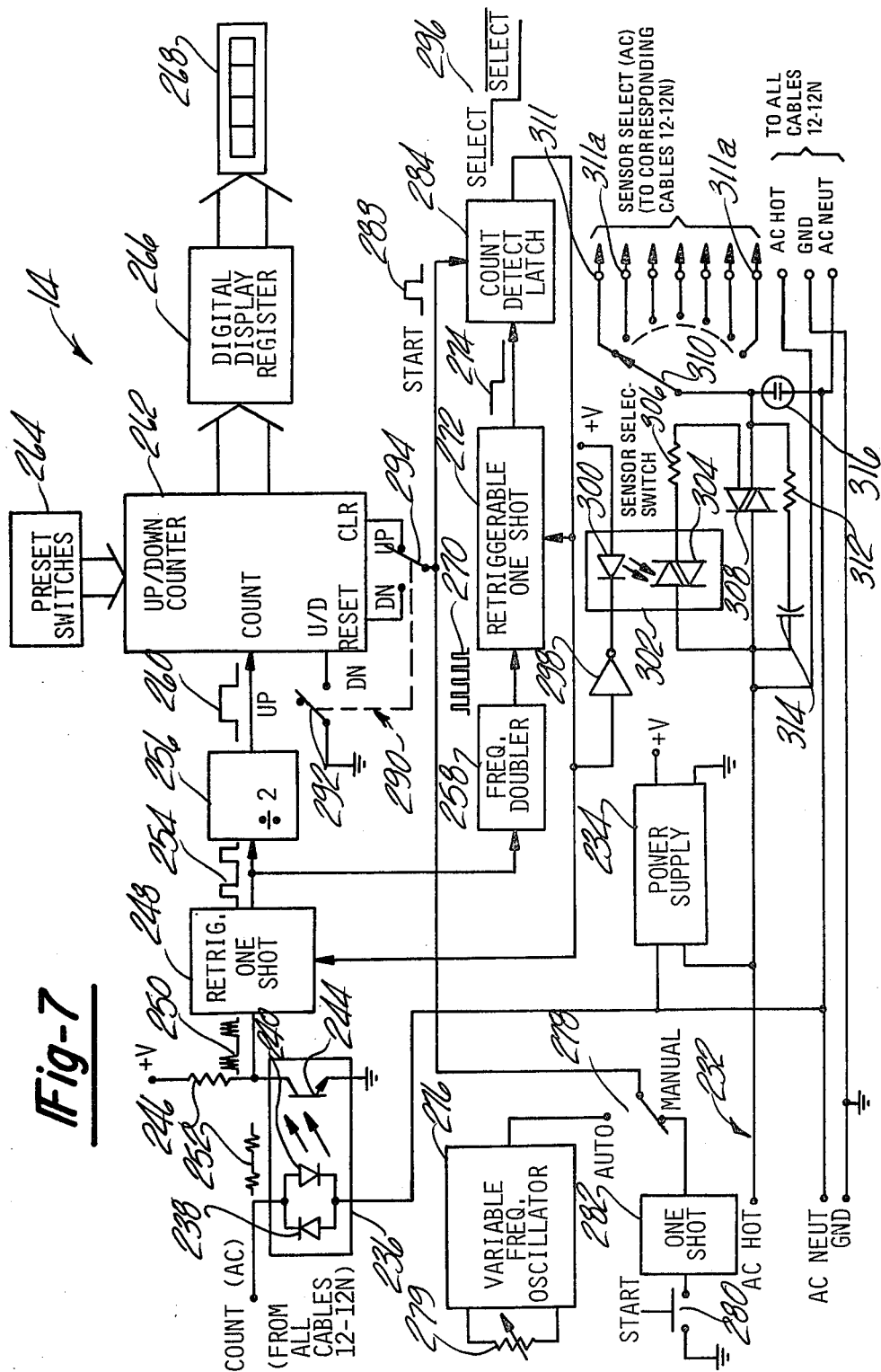
FIG. 7 is a partially schematic and partially functional block diagram of the circuit details in the remote readout unit illustrated in FIG. 1.

FIG. 6 is a schematic diagram of the electrical circuit components in electronic circuit board assembly 148 of sensor unit 10. Circuit assembly 148 receives and transmits signals from and to remote readout unit 14 (FIGS. 1 and 7) on the one hand, and controls operation of motor 56 and processes signals from disc 144 internally of sensor unit 10 on the other. All external circuit connections to electronic assembly 148 are through a nine position terminal block 156 (also shown in FIG. 2). Terminals 1–5 of terminal block 156 are connected by cable 12 to remote readout unit 14 (FIGS. 1 and 7). All signals between the sensor and readout units (with the exception of electrical ground) are either switched or continuous a.c. signals having a nominal amplitude of 120 VAC. This feature eliminates loss problems which would otherwise exist if it were attempted to transmit d.c. signals over cables on the order of several hundred feet in length.

Terminal 1 of block 156 receives a sensor select signal from readout unit 14 (FIGS. 1 and 7) and is connected through a resistor 158 to terminal 9 and thence to motor 56. Terminal 2 is connected through a current limiting resistor 160 to the phototriac 162 of an optical coupler or switch 164 to provide count signals to readout unit 14 responsive to rotation of disc 144 as will be described. Terminals 3 and 4 respectively provide 120 VAC (nominal) neutral and hot signals to a power supply 166 which provides at its output a regulated positive voltage +V with reference to logic ground. Motor 56 has one lead connected through terminals 7 and 3 to a.c. neutral and another lead connected through terminals 6 and 5 to a.c. ground, both from cable 12. A fourth lead is connected through terminal 8 to a motor reversing relay 228 as will be described. Starting capacitor 154 is connected across terminals 8 and 9.

An optical switch 168 has a pair of oppositely poled or inverse light emitting diodes (LEDs) 170,172 connected across resistor 158 and a phototransistor 174 with its emitter connected to electrical ground. The collector of phototransistor 174 is connected to voltage +V through the parallel combination of a resistor 176 and a capacitor 178. The collector of phototransistor 174 is also connected to the cathode of a diode 180 and to one input of an exclusive-or (EOR) gate 182 which has its other input connected to electrical ground. An EOR gate functions to provide a high or logical one output when its two inputs are unequal (logical zero and logical one) and a low or logical zero output when the inputs are equal (either zero or one). In this connection, it should be noted that a positive logic convention is contemplated in FIG. 6 (and FIG. 7), i.e. one wherein "high" or "logical one" means a voltage which approaches +V and "low" or "logical zero" means a voltage which approaches ground. Manifestly, negative or inverse logic may be used as readily. In any event, it will be apparent that the output of gate 182 follows the input from phototransistor 174.

When an alternating current sensor select signal is received on terminal 1 of block 156 from readout unit 14, the alternating voltage across resistor 158 alternatively actuates LEDs 170,172 and thereby pulses the base of phototransistor 174. The collector of phototransistor 174 is effectively connected through the emitter to ground during each such pulse, and the averaging effect of resistor 176 in combination with capacitor 178 is such that the transistor collector voltage remains near ground as long as the phototransistor is pulsed at the nominal frequency of the sensor select signal, i.e. sixty hertz. Thus, when sensor 10 is selected, both inputs to EOR gate 182 are low or a logical zero and the output thereof is also low. When the sensor select signal at terminal 1 is terminated, the alternating voltage across resistor 158 will no longer appear, phototransistor 174 is no longer pulsed and the voltage at the collector output will approach a high or logical one level. This voltage level will reverse bias diode 180 and place the output of gate 182 at a high level.

Optical switch 152 comprises an LED 184 connected in series with a current limiting resistor 186 and a second LED 188 across the d.c. output of power supply 166. LED 188 is used for set-up and maintenance purposes. A phototransistor 190 in optical switch 152 has its emitter connected to ground and its collector connected through a resistor 192 to voltage +V. Thus, rotation of optical disc 144 causes the collector voltage on phototransistor 190 alternatively to switch from a low or logical zero state when a window 146 permits transmission of light from LED 184 to the base of phototransistor 190, and a high or logical one state when such light transmission is blocked by an opaque region of disc 144 between windows 146.

The collector of phototransistor 190 is connected to one input of an EOR gate 194 which has its second input connected to ground. The output of gate 194 is connected through a resistor 198 and then forwardly through an LED 200 in optical switch 164 to the output of gate 182. Thus, when sensor electronics 148 receives a sensor select signal on terminal 1 of block 156 and the output of gate 182 is low as previously described, LED 200 is effectively enabled and pulsing at the collector of phototransistor 190 results in pulsed switching of phototriac 162 as illustrated at 163. During the time that phototriac 162 is turned on, 120 VAC (nominal) at 60 Hz is fed from terminal 4 through resistor 160 to terminal 2. One pulse or burst of a.c. will appear at terminal 2 each time a window 146 passes optical switch 152, or more correctly, each time an opaque region between windows 146 passes the optical switch. Thus, the count signal fed from terminal 2 to readout unit 14 (FIGS. 1 and 7) is illustrated at 252 and effectively comprises pulse-modulated or periodic bursts of 120 VAC (nominal). The number and frequency of such bursts are a direct function of rotation of counter disc 144 and therefore a direct indication of the amount of cable played out. In a preferred embodiment of the invention, the circumferential dimension of pulley 120 (FIGS. 2-4) is closely held to six inches, and optical disc 144 (FIGS. 2, 3, 5 and 6) has a circumferential array of ten equally spaced apertures or windows 146. Triac 162 thus provides a switched or pulsed a.c. count signal 252 to readout unit 14 (FIGS. 1 and 7) at a rate of twenty pulses per traveling foot of drop line 22. The frequency of such pulses depends upon the rate at which cable 22 is unwound (or rewound) which in turn depends upon the effective radius of spool 86 since motor 56 is a constant speed motor. Counting frequencies in the range of 46.6 Hz at maximum cable radius to 19.4 Hz at minimum radius have been calculated for the preferred embodiment shown to scale in the drawings.

Another EOR gate 196 has a first input connected directly to the collector of phototransistor 190. A second input of gate 196 is connected through the current limiting resistor 202 to the collector of phototransistor 190 and through the capacitor 204 to ground. Gate 196 in combination with resistor 202 and capacitor 204 operates as an edge-triggered frequency doubler and feeds a pulsing signal to a retriggerable one-shot 206 at twice the frequency of the count signal generated by disc 144. A resistor 208 and a capacitor 210 are connected in the usual manner to one-shot 206 for setting the desired one-shot relaxation time. A retriggerable high or logical one output of one-shot 206 having a nominal duration of two seconds is fed to the cathode of a diode 212. Diodes 212 and 180 are configured as an AND gate having their anodes connected together at one input of an EOR gate 214 and through the resistor 216 to voltage +V. The other input of gate 214 is connected directly to voltage +V. The output of gate 214 is connected to the cathode of an LED 218 in an optical switch 220. The anode of LED 220 is connected through a resistor 222 to the output of EOR gate 182. A phototriac 224 in switch 220 selectively connects 120 VAC (nominal) at terminal 4 through the coil 226 of a motor reversing relay 228 to a.c. neutral at terminal 3. A pair of normally open relay switch contacts 230 associated with coil 226 are responsive to coil energization through phototriac 224 to connect terminal 8 to terminal 4 for motor reverse or rewind operation.

When sensor electronics 148 receives a select a.c. signal at terminal 1, motor 56 operates through resistor 158 and terminal 9 in the forward direction to feed out or unwind cable 22 (FIGS. 1 and 4) and lower drop weight 20. The collector of phototransistor 174 is low and diode 180 is forward biased to inhibit operation of gate 214. The output of gate 182 also is low and counting pulses 252 are fed by switch 164 and terminal 2 as a function of rotation of optical disc 144 as previously described. The periodic counting pulses at the collector of phototransistor 190 also trigger and then continuously retrigger one-shot 206 through frequency doubler gate 196 and thereby maintain the output of one-shot 206 to diode 212 in a high state. When the sensor select signal is terminated by readout unit 14 in a manner to be described in connection with FIG. 7, motor 56 no longer will be energized through resistor 158 and terminal 9 in the forward direction, and the collector of phototransistor 174 is high as previously described. The output of EOR gate 182 follows the collector of phototransistor 174 to reverse bias LED 200 and thereby inhibit generation of switched a.c. count signals through triac 162. At the same time, the high level at the collector of phototransistor 174 reverse biases diode 180 and thereby enables operation of gate 214, diode 212 also being reversed bias by the output of one-shot 206 retriggered by the last count pulse. The output of gate 214 thus assumes a low state which, coupled with the high output of gate 182, forward biases LED 218, energizes phototriac 224 and relay 226. Relay contacts 230 close and motor 56 is energized in the reverse direction through terminal 8 for rewinding drop line 22 (FIGS. 1 and 4).

When the loop weight has been raised by motor 56 operating in the reverse or rewind direction to the rest position illustrated in FIG. 4, pulley 120 and optical disc 144 cease rotation. A two second hiatus between pulses at the collector of phototransistor 190 allows retriggered one-shot 206 to time out. The resulting low output to diode 212 causes the output of gate 214 to go high and inhibit operation of LED 218. Triac 224 and relay coil 226 are thereby de-energized. Switch 230 reassumes its normally open state and motor 56 is turned off. In the absence of a new sensor select signal during the two second stall in cable rewind necessary for one-shot 206 to time out, slip clutch 90 previously described in connection with FIGS. 2-4 prevents damage to gear drive motor 56.

Referring now to FIG. 7, readout unit 14 includes a three conductor power cord illustrated generally at 232 for connection to 120 VAC (nominal) hot, neutral and ground lines. The hot and neutral lines are connected internally of readout unit 14 to a power supply 234 which provides a logic voltage +V and a reference logic ground. An input optical switch 236 comprises inverse LEDs 238,240 connected at one end to the a.c. neutral line and at the other end to receive a.c. count signal bursts 252 from all sensor cables 12-12n (FIG. 1). Stated differently, terminal 2 of each sensor terminal block 156 (FIG. 6) is connected by its associated cable 12-12n to readout input terminal 242 (FIG. 7). Switch 236 also includes a phototransistor 244 having its emitter connected to ground and its collector connected to +V through a resistor 246. The signal at the collector of phototransistor 244 fed to a retriggerable one-shot 248 comprises a periodic series of pulse groupings illustrated schematically at 250. Each grouping is in effect a rectified replica of a corresponding switched a.c. count signal burst 252. One-shot 248 has a retriggerable time constant which is selected to be slightly greater than the full wave rectified frequency (120 Hz) of the rectified count signals 250, preferably on the order of 68 milliseconds. Thus, the output of retriggerable one-shot 248 comprises one pulse for each rectified signal burst and is illustrated schematically at 254.

The output of one-shot 248 is fed to a divide-by-two counter 256 and to an edge-triggered frequency doubler 258. The output of counter 256 illustrated at 260 is at half the frequency of the signal 254, i.e. represents a count of 10 pulses per traveling foot of drop-weight cable 22 (FIGS. 1 and 4), and is fed to the count or trigger input of an asynchronous decade up/down counter 262. Counter 262 additionally has preset inputs connected to an array of switches 264. The output of counter 262, which is a bit-parallel BCD indication of material level, is fed to a register 266 and then to a digital display 268 (FIGS. 1 and 7). The output of frequency double 258 is illustrated at 270 and is fed to a retriggerable one-shot 272. One-shot 272 provides a retriggerable high output illustrated at 274 having a nominal duration which will span at least two of the frequency-doubled count signals 270 but which is less than the two-second period of one-shot 206 in sensor electronics 148 (FIG. 6). Where the speed of rotation of motor 56 is such that count signal bursts 252 are generated at a rate of one per second, one-shot 272 may be set to time out after frequency-doubled signal 270 is absent for one and one half seconds, for example. Thus, one-shot 272 in readout 14 (FIG. 7) will time out before one-shot 206 in sensor electronics 148 (FIG. 6). The reason for this will be evident from the discussion to follow.

An oscillator 276 receives an input from a variable resistor 279 for selecting an oscillator output period in the range of five to sixty minutes, and has an output connected to one selectable contact of a single pole double throw manual/automatic switch 278 (FIGS. 1 and 7). An operator push button 280 (FIGS. 1 and 7) is connected through a one-shot 282 to the second selectable contact of switch 278. The common contact of switch 278 is connected to the set input of a latch 284. Thus, in a manual mode of operation with switch 278 in the position illustrated in FIG. 7, a set input is fed to latch 284 each time push button 280 is depressed. In the automatic mode of operation with switch 278 in the opposite position, set pulses are fed to latch 284 from oscillator 276 at a selectable frequency. The clear input of latch 284 is connected to receive output 274 from one-shot 272.

A double pole double throw switch 290 is provided selectively for conditioning counter 262 in either an up-counting or a down-counting mode of operation. In the up-counting mode of operation, counter 262 is incremented from zero as drop weight 20 (FIG. 1) is lowered so that the output thereof when the drop weight reaches the material surface indicates head space or ullage in the associated storage bin 18. In the down-counting mode of operation, the counter is decremented from an initial value preset by switches 264 and corresponding to the overall height of storage bin 18 (FIG. 1), so that the value or remainder in counter 262 when drop weight 20 (FIG. 1) reaches the material surface is indicative of actual material height. Switch 290 includes a first pole 292 connected to a control input of counter 262 for selecting either the up-counting or the down-counting mode of operation. A second pole 294 of switch 290 couples the set input of latch 284 either to the clear input of counter 262 for initializing the counter at zero in the up-counting mode of operation or to the preset input of counter 262 for initializing the counter at the numerical value indicated by switches 264 in the down-counting mode of operation.

The output of latch 284, which is illustrated schematically at 296, is set at a high or logical one state by an input 283 from switch 278 if a sensor unit 10-10n (FIG. 1) is to be selected, and is cleared to a low or logical zero state by an input 274 from one-shot 272 when no sensor unit is selected. The output of latch 284 is coupled to inhibit inputs of one-shots 248 and 272 to enable one-shot operation only during a sensor select mode. The latch output is also coupled through an inverting amplifier 298 and in the reverse direction to voltage +V through an LED 300 in the optical switch 302. LED 300 is optically coupled in switch 302 to a phototriac 304 which is connected in series with a current limiting resistor 306 between the hot input of cable 232 and the gate of a discrete triac switch 308. Thus, a high output of latch 284 results in a low output of inverter 298 which forward biases diode 300 and turns on phototriac 304 and switch triac 308. Triac 308 feeds 120 VAC to the common contact of a multiple position rotary switch 310. Each of the several switch-selectable contacts 311-311n in switch 310 is connected to an associated terminal 1 of terminal block 156 (FIG. 6) in a corresponding sensor unit 10-10n (FIG. 1) by means of an associated cable 12-12n. In a preferred embodiment of the invention, switch 310 is a manual rotary switch available for operator selection on the control panel of readout unit 14 as illustrated in FIG. 1. A resistor 312 and a capacitor 314 are connected in series across the main current conducting terminals of triac 308.

The 120 VAC (nominal) hot, neutral and ground lines 232 are additionally connected through each cable 12-12n (FIG. 1) to corresponding terminals 4, 3 and 5 of terminal block 156 (FIG. 6) in each sensor unit 10-10n. A sensor select lamp 316 is connected between a.c. neutral and the common contact of switch 310 for indicating on the control panel of readout unit 14 (FIG. 1) at the sensor selected by switch 310 is in operation. Rotary switch 310, manual start push button 280 and auto/manual switch 278 are available on the front panel of readout unit 214 for operator selection. Up/down counting select switch 290, preset switches 264 and adjustable resistor 279, on the other hand, preferably are internal to readout unit 14 for preadjustment by a technician to a desired mode of operation.

Overall operation of the invention will now be described. Assume an initial condition wherein all of the drop weights 20-20n (FIG. 1) are in the fully raised position illustrated in FIG. 4, that a down-counting mode of operation has been selected at switch 290 (FIG. 7), that switches 264 are preset to the height of each bin 18-18n (all bins being the same height) and that manual operation is selected at switch 278. The operator then places sensor select switch 310 (FIGS. 1 and 7) in the desired position, such as for example corresponding to sensor 10 mounted on bin 18 in FIG. 1. Start button 280 (FIG. 7) is then depressed and one-shot 282 initiates a start pulse 283. The start pulse automatically presets counter 262 to the bin height indicated at switches 264 and simultaneously sets latch 284 to a sensor select condition. Phototriac 304 and switching triac 308 are turned on as previously described, and 120 VAC is fed through triac 308 and switch 310 in readout unit 14 (FIGS. 1 and 7) and through cable 12 (FIG. 1) to terminal 1 of block 156 in sensor electronics 148 (FIGS. 1 and 6) of the selected sensor unit. A sensor select signal from readout unit 14 energizes motor 56 (FIGS. 2, 3 and 6) in the forward direction (clockwise in FIG. 4) so that drop weight 20 is gradually lowered toward the material surface. Co-rotation of pulley 120 (FIGS. 2-4) and disc 144 (FIGS. 2-3 and 5-6) as cable 22 is played out generates counting pulses 163 at the output of gate 194 (FIG. 6). Simultaneously, gate 182 enables operation of LED 200 in photoswitch 164, so that the pulses at the output of gate 194 generate switched a.c. counting bursts 252 at terminal 2 of block 156. These counting bursts are fed by cable 12 to terminal 242 in readout unit 14 (FIG. 7). It will be recognized that the phototriacs 162 (FIG. 6) in all non-selected sensors 10a-10n are open, so that count signal bursts 252 (FIG. 7) are only received at readout unit 14 from the sensor which has been selected by switch 310.

The switched a.c. count signal bursts 252 are processed by one-shot 248 and counter 256 and then fed to counter 262 which, as noted, is in the down-counting mode of operation. Count pulses 260 are received at the input of counter 262 at a rate of ten pulses for each foot of drop weight cable 22 played out as weight 20 is lowered. Simultaneously, the output 254 of one-shot 248 is fed through doubler 258 to retriggerable one-shot 272. When drop weight 20 (FIG. 1) reaches the material surface, the gravitational pull on cable 22 is removed and further unreeling of the cable 22 from spool 86 (FIG. 4) is taken up by rotation of lever 106 in the counterclockwise direction. Expected limit of rotation of pulley 114 and lever 106 is illustrated in phantom in FIG. 4. Pulley 120 and disc 144 no longer rotate, and thus the count signal bursts 252 (FIG. 7) cease. One-shot 272 times out after a selected time period to reset latch 284 and reverse bias or inhibit conduction through LED 300. Thus, the select signal to sensor 10 through switch 310 is terminated. At this point, the value in counter 262 is indicative of the height of material 24 in bin 18 and is switched into register 262 (FIG. 7) and displayed to the operator at 268 (FIGS. 1 and 7).

Termination of the sensor select signal to sensor electronics 148 (FIG. 6) reverse biases diode 180 as previously described. Retriggerable one-shot 206 has a time constant greater than one-shot 272 (FIG. 7) as previously noted and has not yet timed out. Thus, gate 214 operates photoswitch 220 to energize relay 228 and power motor 56 in the reverse or rewind direction. The signals generated by disc 144 as cable 22 is reeled in during the rewind mode of operation are fed to one-shot 206 (FIG. 6) through gate 196 which prevents the one-shot from timing out, but do not generate count signal bursts at terminal 2 of block 156 since the absence of the sensor select signal at photoswitch 168 reverse biases or inhibits diode LED 200 through gate 182. At this time, and in accordance with an important feature of the invention, the operator may rotate switch 310 (FIGS. 1 and 7) to another sensor position, for example corresponding to sensor 10a in FIG. 1, and depress the start button 280. Since sensor 10 is rewinding its drop weight independently of readout unit 14 and is not generating count signals to the readout unit, the count signals received by the readout unit may inherently be associated with selected sensor 10a. Thus, an operator may note the reading at display 268 for sensor unit 10 (FIG. 1) and may proceed to initiate a reading at sensor unit 10a while sensor unit 10 is returning to the rest position (FIG. 4). Thus, the combination of determining material level as weight 20 descends and rewinding cable 22 independently of readout unit 14 offers enhanced efficiency in time savings over prior art material level indicating systems wherein the operator must wait until a selected sensor unit has returned to the rest position before initiating operation of a subsequent sensor unit.

Automated operation at selected intervals may be initiated by placing switch 278 (FIG. 7) in the automatic mode whereby oscillator 276 periodically generates start pulses 283. This option may be conveniently combined with the use of a stepping switch or other means in place of manual rotary switch 310 for sequentially selecting the various sensor units 10-10n. For complete automation, digital display 268 may be replaced or supplemented by automatic recording apparatus such as a printer for recording the material level indication associated with each sensor unit after the select operation has been completed.

The invention claimed is:

1. A drop weight material level indicator comprising support means including a support wall adapted to be mounted in vertical orientation above a material surface whose level is to be sensed, a spool mounted to said wall to rotate about a fixed spool axis, a drop line attached at one end to said spool and having a drop weight suspended from the other end, a motor rotationally coupled to said spool selectively for winding and unwinding said drop line on said spool, a lever arm disposed on said wall to pivot about a fixed lever axis parallel to said spool axis, spring means coupled to said lever arm and to said wall for biasing said lever arm pivotally away from said spool, a first idler pulley carried by said wall freely to rotate about said lever axis, a second idler pulley carried by an end of said lever arm remote from said lever axis and freely rotatable about an axis parallel to said lever axis, a third idler pulley carried by said wall to rotate about a fixed axis parallel to said spool axis, and level sensing means including means responsive to rotation of said third pulley for indicating material level, said drop line being trained from said spool over said second pulley so as to place in tension the portion of said drop line extending between said spool and said second pulley, said drop line being further trained in succession from said second pulley around said first pulley, around said third pulley, again around said first pulley and then to said drop weight, said drop line being in frictional contact with said third pulley over an arc of at least substantially 270° so as to minimize slippage between said drop line and said third pulley.

2. The invention set forth in claim 1 wherein said first pulley includes axially spaced circumferential first and second grooves respectively for receiving portions of said drop line extending between said first and third pulleys and between third pulley and said drop weight.

3. The invention set forth in claim 2 wherein said second pulley is free to float axially with respect to said first pulley so as to float to an axial position which presents minimum resistance to said drop line between said spool and said first pulley.

4. The invention set forth in claim 3 further comprising a friction type slip clutch rotatably coupling said motor to said spool in a first state and responsive in a second state to pulling resistance on said drop line frictionally to slip and thereby disengage said spool from said motor.

5. The invention set forth in claim 4 further including a drive shaft for coupling said motor to said spool, and wherein said clutch comprises means rigidly coupled to said shaft, means adjustably positionable on an end of said shaft and spring means encircling said shaft between said adjustable means and said spool for biasing said spool into frictional contact with said rigidly coupled means with a force which is a function of the position of said adjustably positionable means on said shaft.

6. The invention set forth in claim 1 wherein said level sensing means comprises an optical disc rotationally coupled to said third pulley and means including photoelectronic means responsive to rotation of said disc for indicating material level.

7. The invention set forth in claim 1 wherein said material level indicator comprises separate sensor and readout means, said sensor means including said support means, pulleys, motor, drop line and weight and being adapted to be mounted at the top of a material storage bin, said readout means being adapted for remote control of a plurality of said sensor means, and wherein said level indicating means comprising first means disposed in said readout means and including means for selecting one of a plurality of said sensor means and means responsive to material level signals from the selected said sensor means for indicating material level associated with the selected said sensor means, said level indicating means further comprising second means disposed in each said sensor means and including means responsive to selection of the corresponding said sensor means for lowering said drop weight in a first mode of operation, means operable in said first mode of operation for transmitting material level signals to said readout means and means operable in a second mode of operation for raising said drop weight independently of said readout means, such that said readout means is adapted simultaneously to operate first and second of said sensor means in said first and second modes of operation respectively.

8. A material level monitoring system comprising a plurality of at least two material storage locations, a material level sensor unit of the drop weight type disposed at each said location, each said sensor unit including means responsive to a select signal for lowering an associated drop weight, means operable during said select signal for transmitting a periodic count signal until said drop weight is lowered to the associated material surface and means responsive to termination of said select signal to raise said drop weight and also to inhibit transmission of said count signal, and a readout unit individually connected to said plurality of sensor units and including means for transmitting a continuous select signal to a selected first one of said sensor units, means responsive to a said periodic count signal from said first sensor unit for indicating material level associated with said first sensor unit, means responsive to termination of said count signal when the drop weight in said selected first sensor unit reaches the associated material surface for terminating said continuous select signal to said first sensor unit, and means adapted for transmitting a second continuous select signal to a second of said sensor units as the first said sensor unit raises the associated drop weight.

9. The invention set forth in claim 8 wherein said means responsive to termination of said count signal in said readout unit comprises first retriggerable means having a first time constant which is reset by each of said periodic count signals as said drop weight is lowered, and wherein said means responsive to termination of said select signal in each of said sensor units comprises second retriggerable means having a second time constant longer than said first time constant which is reset by each of said periodic count signals while said drop weight is lowered and raised, relay means responsive to termination of said select signal to reverse operation of said motor and means responsive to time out of said second retriggerable means to reset said relay means.

10. A method of monitoring material level at a plurality of at least two material storage locations comprising the steps of: (a) locating at each said storage location a material level sensor unit of the drop weight type, each said sensor unit being responsive to a select signal for lowering its associated drop weight and generating a count signal indicative of material distance, (b) connecting a common readout unit individually to said plurality of sensor units, said readout unit being adapted for individually selecting each said sensor units and responsive to count signals from the sensor unit so selected for indicating associated material level, (c) transmitting a select signal to a first of said sensor units and monitoring count signals from said first sensor unit while the drop weight associated with said first sensor unit is lowered, (d) displaying material level associated with said first sensor unit when the drop weight descends to the material level, and then (e) transmitting a select signal to a second of said sensor units and monitoring count signals from the second sensor unit while the drop weight is being raised in said first sensor unit.

11. A drop weight material level indicator comprising a spool, a drop line wound around said spool and having a drop weight suspended therefrom, a motor rotationally coupled to said spool selectively for lowering and raising said drop weight, an idler pulley over which said drop line is trained such that said idler pulley is adapted to rotate as a function of drop line motion in both raising and lowering directions, means disposed between said spool and said idler pulley for taking up limited slack on said drop line when said drop weight reaches a material surface, and level sensing means responsive to rotation of said idler pulley and comprising an optical disc rotationally coupled to said idler pulley, photoelectric means for generating a series of counting pulses as a function of disc rotation and means responsive to said counting pulses both for determining material level and for controlling said motor, said means responsive to said counting pulses comprising first retriggerable means responsive to termination of said counting pulses for a first duration to indicate that said drop weight has reached said material surface, means responsive to said first retriggerable means for reversing said motor and second retriggerable means responsive to termination of counting pulses for a second duration greater than said first duration when said drop weight has been fully raised to turn off said motor.

12. The invention set forth in claim 11 wherein said material level indicator comprises separate sensor and readout means, said sensor means being adapted to be mounted at a material storage location and including said drop line and weight, said spool, pulley and motor, said take-up means, said optical disc and second retriggerable means; said readout means being adapted for remote control of a plurality of said sensor means and including said first retriggerable means.

13. The invention set forth in claim 12 wherein said readout means further comprises means for transmitting a select signal to a selected one of said sensor means and means responsive to said first retriggerable means for terminating said select signal, and wherein said sensor means includes means responsive to an associated said select signal for initiating a first phase of operation wherein said drop weight is lowered and means responsive to termination of said select signal for initiating a second phase of operation wherein said drop weight is raised.

14. In a drop weight material level indicator for use in indicating a level of material in a storage bin of predetermined height and which includes means disposed at the top of said bin for selectively lowering and raising a drop weight in an operating cycle, means for initiating an operation cycle, means responsive to travel of said drop line to generate counting pulses and means for indicating material level from said counting pulses, the improvement wherein said indicating means comprises an up/down digital counter, switch means for selecting in one condition an up-counting mode of operation in which said counter is responsive to said counting pulses for indicating head space through which said drop weight is lowered to said material surface and for selecting in a second condition a down-counting mode of operation in which said counter is responsive to said counting pulses for indicating height of material in said bin, and means responsive to said initiating means in said second conductive condition of said switch means for presetting said counter to a value indicative of said predetermined bin height.

15. The invention set forth in claim 14 further comprising digital display means coupled to said counter for indicating material level upon completion of said operating cycle.

* * * * *